United States Patent
Gottemukkala et al.

(10) Patent No.: US 12,499,130 B2
(45) Date of Patent: *Dec. 16, 2025

(54) ALERT-BASED LEARNING FOR MULTI-DIMENSIONAL DATA PROCESSING

(71) Applicant: o9 Solutions, Inc., Dallas, TX (US)

(72) Inventors: Chakradhar Gottemukkala, Austin, TX (US); Baskaran Manohar, Dallas, TX (US); Koustuv Chatterjee, Gilbert, AZ (US)

(73) Assignee: o9 Solutions, Inc., Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/654,827

(22) Filed: May 3, 2024

(65) Prior Publication Data

US 2024/0403325 A1 Dec. 5, 2024

Related U.S. Application Data

(63) Continuation of application No. 17/235,596, filed on Apr. 20, 2021, now Pat. No. 12,001,455.

(51) Int. Cl.
 *G06F 16/28* (2019.01)
 *G06F 16/901* (2019.01)
 *G06N 20/00* (2019.01)

(52) U.S. Cl.
 CPC ........ *G06F 16/283* (2019.01); *G06F 16/9024* (2019.01); *G06N 20/00* (2019.01)

(58) Field of Classification Search
 CPC .... G06F 16/283; G06F 16/9024; G06N 20/00
 See application file for complete search history.

(56) References Cited

U.S. PATENT DOCUMENTS

| | | | | |
|---|---|---|---|---|
| 11,113,274 | B1 * | 9/2021 | Thiel | G06N 20/00 |
| 11,250,069 | B1 * | 2/2022 | Bianchi | G06F 16/9038 |
| 2020/0004751 | A1 | 1/2020 | Stennett et al. | |
| 2020/0210947 | A1 * | 7/2020 | Devarakonda | G06Q 10/06312 |
| 2022/0036154 | A1 * | 2/2022 | Yeddu | G06N 3/044 |
| 2022/0335064 | A1 | 10/2022 | Gottemukkala et al. | |

OTHER PUBLICATIONS

"U.S. Appl. No. 17/235,596, Final Office Action mailed Apr. 18, 2023", 19 pgs.
"U.S. Appl. No. 17/235,596, Non Final Office Action mailed Sep. 8, 2023", 21 pgs.

(Continued)

*Primary Examiner* — Courtney Harmon
(74) *Attorney, Agent, or Firm* — Schwegman Lundberg & Woessner, P.A.

(57) ABSTRACT

Systems and techniques for alert-based learning for multi-dimensional data processing are described herein. Alert data may be received from a big data platform. An alert definition may be generated that includes a set of key performance indicators (KPIs) for an alert based on a determination that an alert definition does not exist for the alert. A calculation configuration may be created for the alert. Historical data from the big data platform may be evaluated with the calculation configuration to calculate the KPIs. An alert condition may be established for the alert based on the KPIs. The alert condition may be stored in the big data platform.

20 Claims, 5 Drawing Sheets

(56) References Cited

OTHER PUBLICATIONS

"U.S. Appl. No. 17/235,596, Non Final Office Action mailed Oct. 12, 2022".
"U.S. Appl. No. 17/235,596, Notice of Allowance mailed Feb. 2, 2024", 8 pgs.
"U.S. Appl. No. 17/235,596, Response filed Jan. 8, 2024 to Non Final Office Action mailed Sep. 8, 2023", 12 pgs.
"U.S. Appl. No. 17/235,596, Response filed Feb. 13, 2023 to Non Final Office Action mailed Oct. 12, 2022", 14 pgs.
"U.S. Appl. No. 17/235,596, Response filed Jul. 18, 2023 to Final Office Action mailed Apr. 18, 2023", 12 pgs.

* cited by examiner

```
                                    ┌─ 400
                              ┌─ 405
        ┌─────────────────────────────────────────────────────┐
        │      RECEIVE ALERT DATA FROM THE BIG DATA PLATFORM  │
        └─────────────────────────────────────────────────────┘
                                    │
                              ┌─ 410 ▼
        ┌─────────────────────────────────────────────────────┐
        │  GENERATE AN ALERT DEFINITION INCLUDING A SET OF KEY PERFORMANCE │
        │  INDICATORS (KPIS) FOR AN ALERT BASED ON A DETERMINATION THAT AN ALERT │
        │         DEFINITION DOES NOT EXIST FOR THE ALERT     │
        └─────────────────────────────────────────────────────┘
                                    │
                              ┌─ 415 ▼
        ┌─────────────────────────────────────────────────────┐
        │        CREATE A CALCULATION CONFIGURATION FOR THE ALERT │
        └─────────────────────────────────────────────────────┘
                                    │
                              ┌─ 420 ▼
        ┌─────────────────────────────────────────────────────┐
        │ EVALUATE HISTORICAL DATA FROM THE BIG DATA PLATFORM WITH THE │
        │      CALCULATION CONFIGURATION TO CALCULATE THE KPIS │
        └─────────────────────────────────────────────────────┘
                                    │
                              ┌─ 425 ▼
        ┌─────────────────────────────────────────────────────┐
        │  ESTABLISH AN ALERT CONDITION FOR THE ALERT BASED ON THE KPIS │
        └─────────────────────────────────────────────────────┘
                                    │
                              ┌─ 430 ▼
        ┌─────────────────────────────────────────────────────┐
        │      STORE THE ALERT CONDITION IN THE BIG DATA PLATFORM │
        └─────────────────────────────────────────────────────┘
```

*FIG. 4*

ALERT-BASED LEARNING FOR MULTI-DIMENSIONAL DATA PROCESSING

CLAIM OF PRIORITY

This application is a continuation of U.S. patent application Ser. No. 17/235,596, filed Apr. 20, 2021, which is incorporated by reference herein in its entirety.

TECHNICAL FIELD

Embodiments described herein generally relate to data analysis in data store platforms and, in some embodiments, more specifically to alert-based learning which performs analysis on multidimensional data (e.g., in a graph cube network used for a "big data" platform) and implements specific compute operations as a result of such analysis.

BACKGROUND

Large data warehouses (commonly referred to as "big data" platforms) may include millions of records of data that may be structured or unstructured. Casual analysis of data contained in a big data platform may be unable to observe conditions occurring in a graph cube network of the big data platform because of the vast number of records and the interdependence between data elements that may not be readily apparent. Users may desire to be alerted to data-triggered conditions that are present within the graph cube network of the big data platform. For example, a user may wish to know the status of conditions occurring within the graph cube network that may depend on near real-time decision making to remediate issues in occurring in the data corresponding to maintain the integrity and efficiency of the graph cube network.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 4 illustrates an example of a method for alert-based learning for multi-dimensional data processing, according to an embodiment.

DETAILED DESCRIPTION

Figure 1:
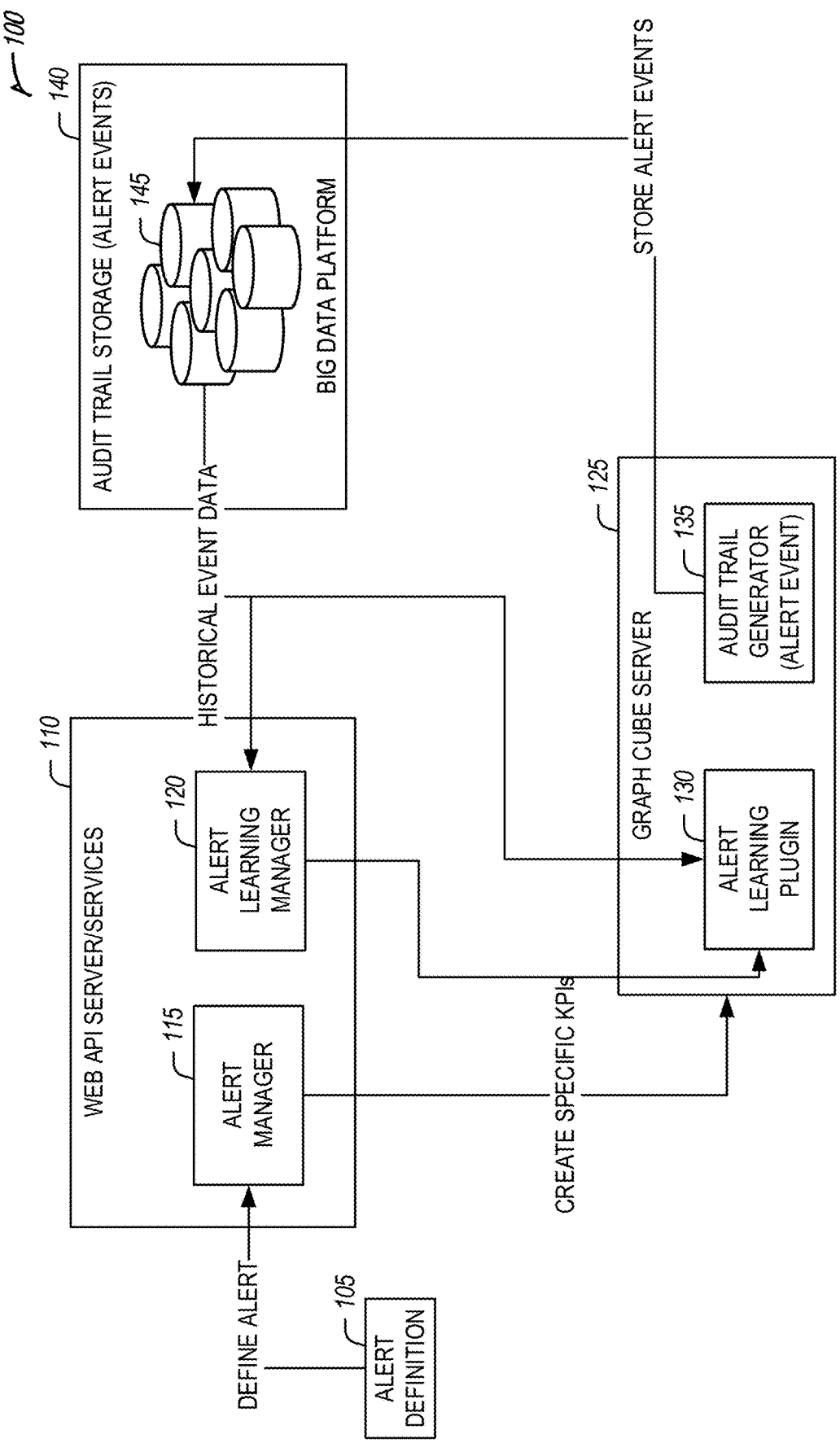
FIG. 1 is a block diagram of an example of an environment for alert-based learning for multi-dimensional data processing, according to an embodiment.

A big data dataset may be too large and complex to be evaluated using conventional data processing techniques. A big data platform may include a collection data that may be related to or include data in databases, data warehouses, data lakes, etc. that may be include in one or more big data datasets. For example, a big data dataset for a real-world, complex setting may include millions of records that describe relationships in a graph cube network for individual items and actions with such items. The graph cube network may be maintained within a multidimensional data warehouse containing nodes and edges that describe relationships between the nodes.

The complexities of a large data structures, multidimensional data representations, and data warehouses often will make evaluation by humans unfeasible, at least in part, because any number of humans may not be able to evaluate the complexities and quantities of data in a timely enough manner to meet the time constraints of data processing requirements. For example, consider all of the types of data that is maintained for various data producers and consumers in a global supply chain for some item. The various data processing actions that are implicated in this setting may include the creation and access of millions of data records that describe relationships in a graph cube network for individual items (e.g., products) and actions with such products that occur among any number of geographic locations. Traditional data processing techniques are ineffective for evaluating large complex data structures produced in these and similar settings.

The systems and techniques discussed herein provide a technical solution for many aspects of evaluating big data datasets, including to capture exceptional data conditions and automatically execute instructions to correct or modify computing instructions based on the data conditions. For example, computing instructions may be modified or corrected by executing playbooks, scenarios, etc. Furthermore, the systems and techniques discussed herein allow for the capture and storage of alert events for historical analysis using an audit trail framework. These techniques provide the computing system with the ability to effectively evaluate big data datasets in a timely manner to make decisions about what automated actions to complete based on current data conditions.

The storage of historical alert events allows the computing system to learn from alert events. For example, the computing system may learn recurrent patterns from evaluating data conditions of the big data dataset. The learning is captured as data and is usable by the computing system in subsequent downstream computations and decision making. For example, if historically a stock keeping unit (SKU) or store has a record of over forecasting as determined based on an evaluation of the data conditions in a supply chain big data dataset, then the computing system may choose to not expedite a shipment for the SKU or store based on the history of forecast inaccuracy when making product shipment expediency decisions.

To make expedited decisions based on the data either autonomously (or by a human agent), the distillation of various alert events is captured that have occurred over a long-time range. The captured data is transformed into succinct data and stored in the data warehouse for use as training data, for making future evaluations, decisions, etc.

Various technical Key Performance Indicators (KPIs) are defined that are specific to each alert. The KPIs are modeled as measures. The grain (e.g., hierarchy level, node level, etc.) of an alert KPI measure is similar to the grain of the alert except a timegrain, if any, is dropped, as by definition, this is a distillation of historical information into a metric that characterizes the performance of an intersection (e.g., shared edge between an alert and nodes, etc.) over time. Grain refers to a level of a hierarchy, a segment of a graph cube network, etc. to which an alert belongs. The Grain may include temporal information, for example, in the case of an alert. The timegrain is dropped to associate the KPI measure more generally with a hierarchical level.

For example, a "% TimeOnAlert" KPI may be defined. To provide unique KPI measures for each alert and for each alert severity state, actual measures may be "<AlertName>_PctTimeOnHiAlert," "<AlertName>_PctTimeOnMedAlert," and "<AlertName>_PctTimeOnLowAlert." If the underlying alert measure is non time-grained, the alert measure is stored in the same measure group as the original alert measure group. If the underlying alert measure is time-grained, a new alert KPI measure group is created that drops the timegrain from the grain of the alert KPI measure.

The alert KPI measures may be populated by a platform defined (e.g., on-demand, etc.) plugin, which when invoked, inserts the relevant metrics by extracting the information from an alert audit trail, performs the requisite calculations, and then persists the results to the destination logistics system (LS) measures.

For example, an alert measure may be defined as PluginName: AlertLearning ([Alert Name], {horizon: default 180 (days)}). An example calculation may define % TimeOnAlert as the sum of time ranges when this alert state was active (in days) over the time horizon/length of the time horizon (e.g., minimum 1, max 180). As it is a percentage measure, the default aggregation rule may be "average." User defined aggregation rules may be supported on the alert KPI measure (e.g., computed aggregate). User interface (UI) impact is minimized because users are free to visualize the alert KPI measures in user defined UI widgets (e.g., grids, etc.) and is handled primarily by an alert framework related application programmer interface (API) and LS.

Machine learning (ML) models may inspect the relationships between various characteristics of the members and member-intersections which are part of the alerted intersections and the historical alert KPI, edge products of a category, in a region that are perennially overstocked or out-of-stock.

FIG. 1 is a block diagram of an example of an environment 100 for alert-based learning for multi-dimensional data processing, according to an embodiment. The environment 100 may include an alert definition 105, a web server or web services API 110 that may include an alert manager 115 and an alert learning manager 120, a graph cube server 125 that includes an alert learning plugin 130 and an audit trail generator 135, and audit trail storage 140 that includes a big data platform 145. In an example, the alert learning plugin 130 may be a software component of the graph cube server 125 that, when executed by at least one processor, causes the at least one processor to perform the features as described in FIG. 1.

KPIs are created that are specific to each alert automatically when an alert and its alert measure is defined by the alert definition 105. The alert and the alert measure may be defined automatically by the alert manager 115 through detection using a machine learning algorithm to classify data conditions as new alerts with their corresponding alert measures or may be defined via a user interface by an administrator. In an example, a representational state transfer (REST) of the alert manager 115 determines the need for and creates the key KPI measures for each alert in a graph cube server 125.

The graph cube server 125 populates an alert measure when an alert data condition is met as detected by the alert learning plugin 130 and the audit trail generator 135 raises an alert event. Alert events are sent (e.g., via a network, etc.) to the audit trail storage 140. In an example, the alert event may be sent to the audit trail storage 140 through a background thread of the graph cube server 125 using a REST client (e.g., APACHE HBASE™ REST client, etc.). The audit trail storage 140 stores the alert events in a big data storage platform (e.g., APACHE HBASE™, etc.) 145. The alert events are stored at the grain of the alert measure.

The alert learning plugin 130 calculates and populates specific KPIs. The alert learning plugin 130 may accept parameters like "Alert name" and "Horizon (in days)" as input parameters. The alert learning plugin 130 allows for addition of new features to the graph cube server 125. The alert learning plugin 130 calculates and writes its output metrics to a specific KPI measure that corresponds to the alert. To perform a calculation, the historical alert event data stored in the big data platform 145 is queried using a query engine for the given input (e.g., alert name, time horizon, etc.) of the audit trail storage 140. The historical alert event data includes a complete scope of an intersection. Each specific KPI measure defines its calculation formula. The alert learning plugin 130 enables infrastructure to define and register a specific KPI and its calculator. This allows for the addition of new specific KPIs in the future and corresponding calculation logic without having to extract data relevant for the calculation. The alert learning plugin 130 queries and extracts the scoped intersection data required for the calculation.

The intersections for each distinct set are iterated by the input time horizon to calculate a KPI metric based on the formula defined for the specific KPI measure by invoking the calculator for the specific KPI. The alert learning plugin 130 calculates and writes its output metrics to the specific KPI measures that correspond to the alert. The calculated KPI metric is at the same grain as the input alert.

When the metrics are computed for KPIs, the KPI measure is updated with the calculated value. Each KPI measure is hosted by the graph cube server 125 in memory and the update takes effect. The alert learning plugin 130 is executed on-demand or may be automated via a scheduled job to calculate specific KPIs periodically.

Once the KPI metrics are available, ML techniques may be used to trace the root cause of persistent issues as determined by evaluation of the alert condition data. An alert condition may be a Boolean evaluation of operational data to determine whether an alert should be raised due to an exceptional situation occurring within the big data platform. For example, a feature importance analysis machine learning algorithm may be applied to the KPI metrics to identify features that may indicate a most likely cause of a persistent issue. For example, the ML algorithm may determine that a shortage in a product component supply at an intersection in a supply chain is the root cause of a persistent understock condition for a product at a retailer. Various features, such as Product Category, Region, or Season components used in a Bill-Of-Material of an item, transport modes used, upstream distribution centers, etc. may be modeled as features. Then machine learning may be applied to build models that point out which of these features (factors) are strongly correlated to the problematic historical performance of a member intersection (e.g., a SKU at a store).

Figure 2:
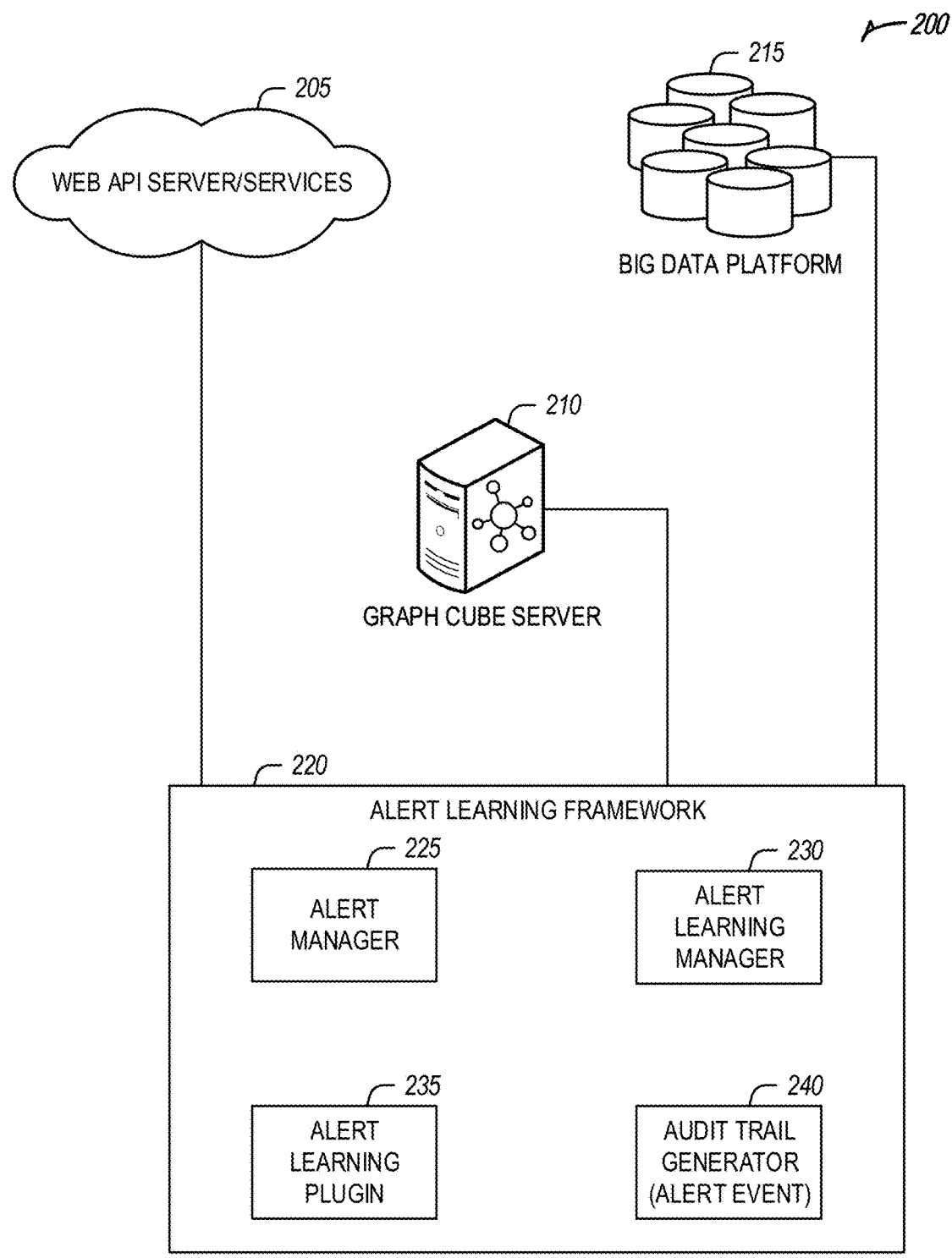
FIG. 2 is a block diagram of an example of a system for alert-based learning for multi-dimensional data processing, according to an embodiment.

FIG. 2 is a block diagram of an example of a system 200 for alert-based learning for multi-dimensional data processing, according to an embodiment. The system 200 may provide features as described in FIG. 1. The system 200 may include a web API server or service 205, a graph cube server 210, and a big data platform 215. The web API server or service 205, the graph cube server 210, and the big data platform 215 may be communicatively coupled (e.g., via wired network, wireless network, shared bus, etc.) to an alert learning framework 220. The alert learning framework 220 may include a variety of components including an alert manager 225, an alert learning manager 230, an alert learning plugin 235, and an audit trail generator 240.

The alert manager 225, the alert learning manager 230, the alert learning plugin 235, and the audit trail generator 240 components may operate as hardware (e.g., application specific integrated circuit (ASIC), field programmable gate array (FPGA), etc.) or software. The components may be distributed amongst and be executed on the web API server or service 205, the graph cube server 210, the big data platform 215, or other network connected servers or services.

The audit trail generator 240 may track alert data for alert events and may store the alert data in the big data platform 215. Alert data may include sate information of the graph cube server 210 environment at the time of the alert. The alert data may include a variety of data elements that may be related to an object of the alert. For example, a stock level alert for a SKU may include alert data including a date of last resupply, temporal information (e.g., when the alert occurred, holidays occurring during the alert, length of alert, etc.), data points for supply nodes for the SKU, production levels, transportation data, etc. The alert manager 225 may receive alert data from the big data platform 215. The alert manager 225 may generate an alert definition including a set of specific performance indicators (KPIs) for an alert based on a determination that an alert definition does not exist for the alert. In an example, the alert data may include an alert measure. The alert definition may be generated using the alert measure. The alert manager 225 may create a calculation configuration for the alert. In an example, the calculation configuration may include a set of rules for calculating measures for the KPIs. In an example, the alert definition may be generated by a representational state transfer (REST) of an application programmer interface (API).

The alert learning manager 230 or the alert learning plugin 235 may evaluate historical data from the big data platform 215 with the calculation configuration to calculate the KPIs. The alert learning manager 230 or the alert learning plugin 235 may establish an alert condition for the alert based on the KPIs and may store the alert condition in the big data platform 215. In an example, the alert condition may be determined based on measures calculated for the KPIs.

In an example, scopes may be identified for a set of intersections of a graph data structure corresponding to the alert and the set of intersections may be iterated through based on its scope to calculate measures for the KPIs. In an example, the measures for the KPIs may be aggregated to calculate a KPI metric and the KPI metric for the alert may be stored in the big data platform 215.

Figure 3:
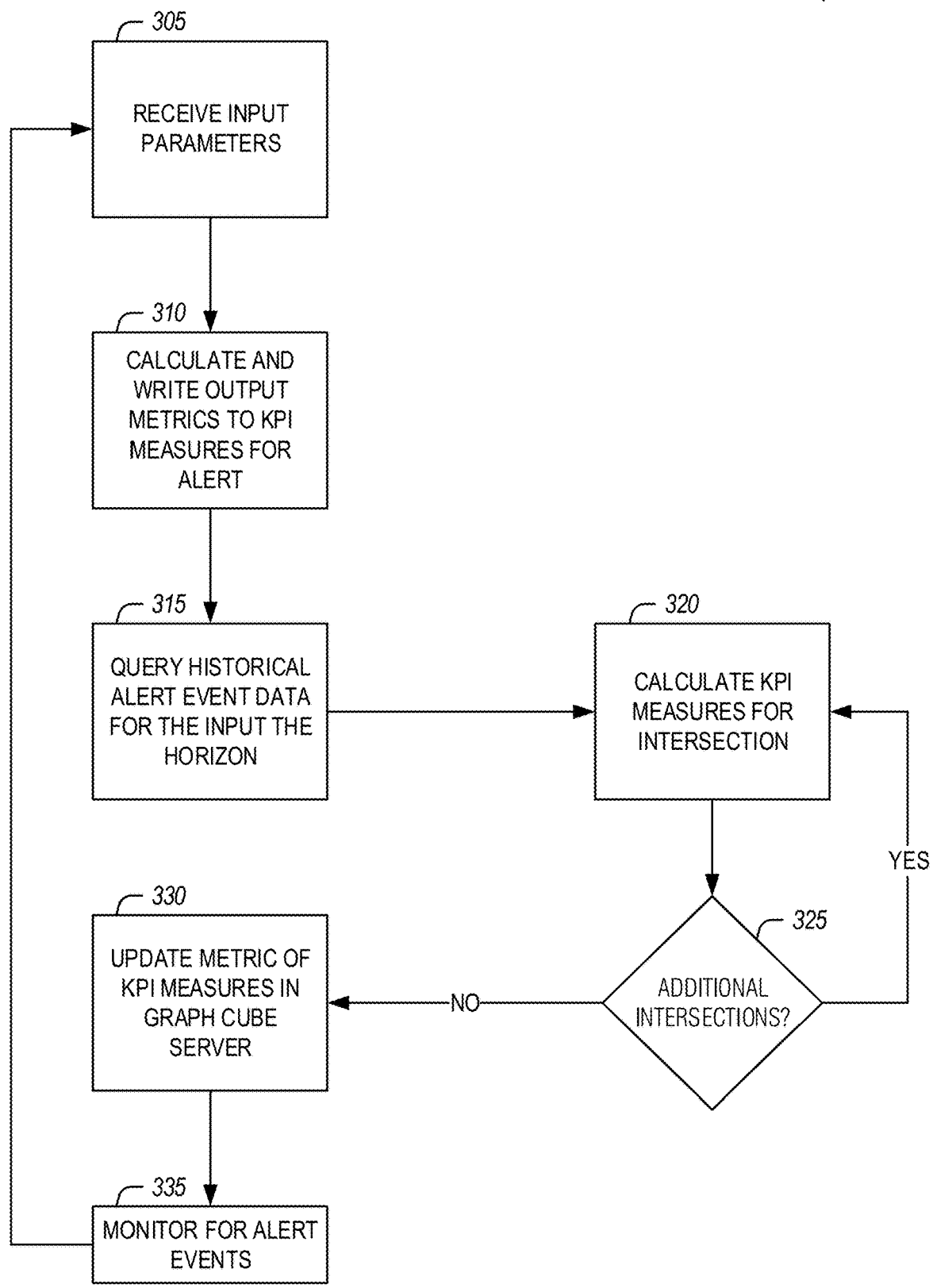
FIG. 3 illustrates an example of a process for alert-based learning for multi-dimensional data processing, according to an embodiment.

FIG. 3 illustrates an example of a process 300 for alert-based learning for multi-dimensional data processing, according to an embodiment. The process 300 may provide features as described in FIGS. 1 and 2.

The specific KPI specific to an alert is created automatically when an alert data condition and its alert measure is defined. REST APIs of the alert framework determine the need and create the specific KPI measures in the graph cube server. The graph cube server populates an alert measure when an alert data condition is met and raises an alert event. Alert events are sent to audit trail storage through a background thread of graph cube server that uses a REST client.

The audit trail framework uses a big data platform as its storage. Alert events are stored at the grain of the alert measure. An alert learning plugin calculates and populates specific KPIs. The plugin allows addition of new features to the Graph Cube server.

At operation 305, the alert learning plugin may accept input parameters. For example, input parameters may include, by way of example and not limitation, alert name, horizon (in days), etc. as input parameters. At operation 310, the alert learning plugin calculates and writes its output metrics to corresponding specific KPI measures for the alert.

At operation 315, the historical alert event data stored in big data platform may be queried using a query engine of the audit trail framework for the given input. For example, alert name and time horizon. An intersection may provide a connection between nodes, edges, entities, data elements, etc. in the big data platform. In an example, a scope may be applied to an intersection to limit the breadth of the dataset to certain elements. The historical alert event data includes the complete scope of the intersection so that a full state of the graph cube network is available for analysis.

At operation 320, the intersections from are iterated though. For each distinct set by input (e.g., time horizon), the specific KPI measure is calculated by invoking the specific KPI's calculator. Each specific KPI measure defines its calculator. The alert learning plugin enables infrastructure to define and register a specific KPI and its calculator. This allows for addition of new specific KPIs in the future and corresponding calculation logic without having to extract data relevant for the calculation. The alert learning plugin queries and extracts the scoped intersection data required for the calculation. The calculated KPI metric is at the same grain as the input alert. When there are no more intersections to evaluate (decision block 325), the process 300 continues to operation 330.

At operation 330, the metrics of specific KPI measures are updated with the calculated value. Each KPI measure is hosted by the graph cube server in-memory and the update takes effect immediately. At operation 335, the alert learning plugin continues to monitor for alert events. In an example, the alert learning plugin may be executed on-demand or automated via a scheduled job to calculate specific KPIs periodically.

FIG. 4 illustrates an example of a method 400 for alert-based learning for multi-dimensional data processing, according to an embodiment. The method 400 may provide features as described in FIGS. 1 to 3.

Alert data may be tracked (e.g., by the audit trail generator 240 as described in FIG. 2, etc.) for alert events and may store the alert data in the big data platform (e.g., the big data platform 215 as described in FIG. 2, etc.). At operation 405, alert data may be received (e.g., by the alert manager 225 as described in FIG. 2, etc.) from the big data platform. At operation 410, an alert definition may be generated (e.g., by the alert manager 225 as described in FIG. 2, etc.) that includes a set of specific performance indicators (KPIs) for an alert based on a determination that an alert definition does not exist for the alert. In an example, the alert data may include an alert measure and the alert definition may be generated using the alert measure. At operation 415, a calculation configuration may be created (e.g., by the alert manager 225 as described in FIG. 2, etc.) for the alert. In an example, the calculation configuration may include a set of rules for calculating measures for the KPIs. In an example, the alert definition may be generated by a representational state transfer (REST) of an application programmer interface (API).

At operation 420, historical data from the big data platform may be evaluated (e.g., by the alert learning manager 225 as described in FIG. 2, the alert learning plugin 235 as described in FIG. 2, etc.) with the calculation configuration to calculate the KPIs. At operation 425, an alert condition may be established (e.g., by the alert learning manager 225 as described in FIG. 2, the alert learning plugin 235 as described in FIG. 2, etc.) for the alert based on the KPIs. At operation 430, the alert condition may be stored in the big data platform. In an example, the alert condition may be determined based on measures calculated for the KPIs.

In an example, scopes may be identified for a set of intersections of a graph data structure corresponding to the alert and the set of intersections may be iterated through based on its scope to calculate measures for the KPIs. In an example, the measures for the KPIs may be aggregated to calculate a KPI metric and the KPI metric for the alert may be stored in the big data platform.

Figure 5:
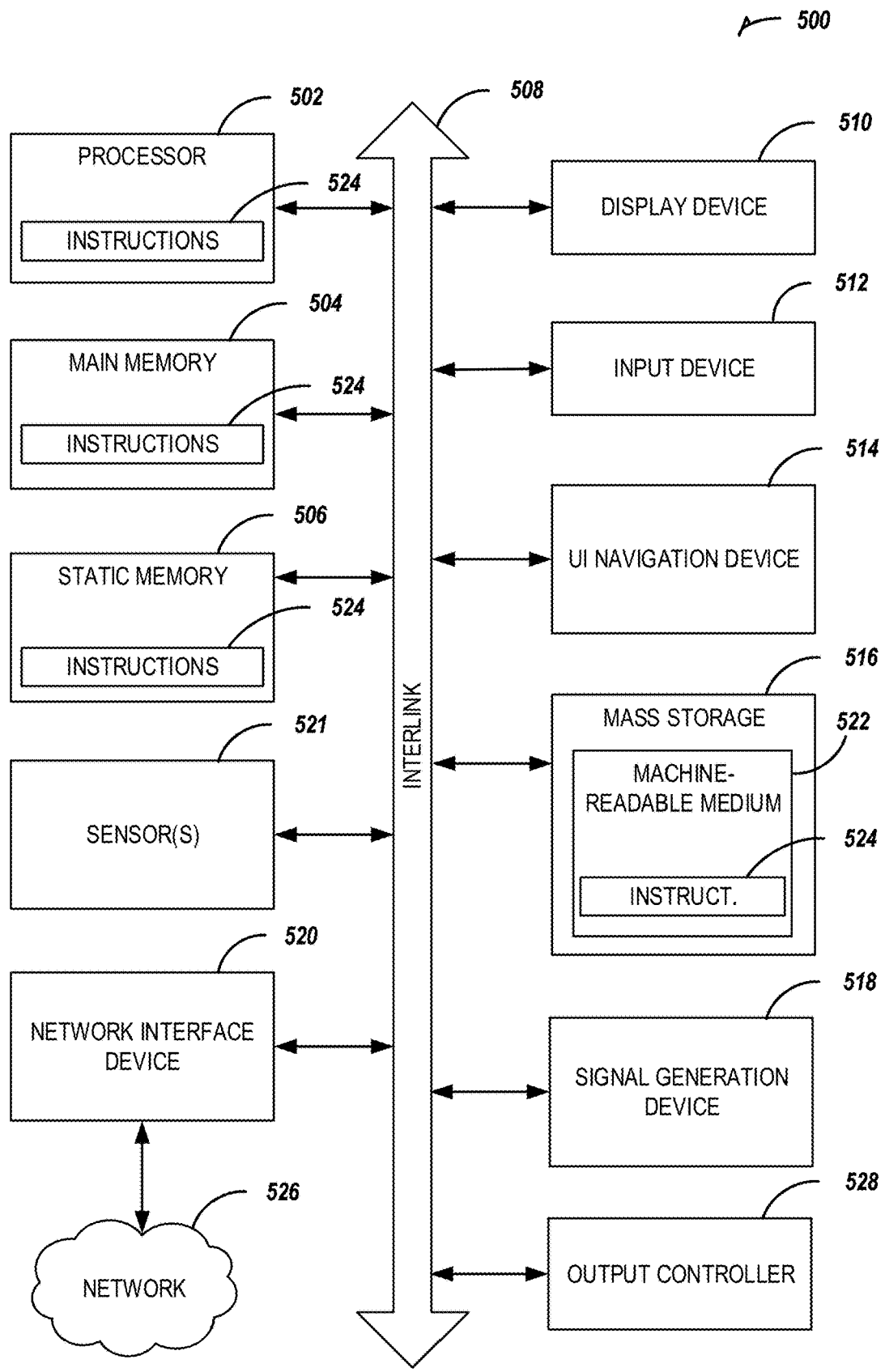
FIG. 5 is a block diagram illustrating an example of a machine upon which one or more embodiments may be implemented.

FIG. 5 illustrates a block diagram of an example machine 500 upon which any one or more of the techniques (e.g., methodologies) discussed herein may perform. In alternative embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in peer-to-peer (P2P) (or other distributed) network environment. The machine 500 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuit sets are a collection of circuits implemented in tangible entities that include hardware (e.g., simple circuits, gates, logic, etc.). Circuit set membership may be flexible over time and underlying hardware variability. Circuit sets include members that may, alone or in combination, perform specified operations when operating. In an example, hardware of the circuit set may be immutably designed to carry out a specific operation (e.g., hardwired). In an example, the hardware of the circuit set may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

Machine (e.g., computer system) 500 may include a hardware processor 502 (e.g., a central processing unit (CPU), a graphics processing unit (GPU), a hardware processor core, or any combination thereof), a main memory 504 and a static memory 506, some or all of which may communicate with each other via an interlink (e.g., bus) 508. The machine 500 may further include a display unit 510, an alphanumeric input device 512 (e.g., a keyboard), and a user interface (UI) navigation device 514 (e.g., a mouse). In an example, the display unit 510, input device 512 and UI navigation device 514 may be a touch screen display. The machine 500 may additionally include a storage device (e.g., drive unit) 516, a signal generation device 518 (e.g., a speaker), a network interface device 520, and one or more sensors 521, such as a global positioning system (GPS) sensor, compass, accelerometer, or other sensors. The machine 500 may include an output manager 528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 516 may include a machine readable medium 522 on which is stored one or more sets of data structures or instructions 524 (e.g., software) embodying or utilized by any one or more of the techniques or functions described herein. The instructions 524 may also reside, completely or at least partially, within the main memory 504, within static memory 506, or within the hardware processor 502 during execution thereof by the machine 500. In an example, one or any combination of the hardware processor 502, the main memory 504, the static memory 506, or the storage device 516 may constitute machine readable media.

While the machine readable medium 522 is illustrated as a single medium, the term "machine readable medium" may include a single medium or multiple media (e.g., a centralized or distributed database, and/or associated caches and servers) configured to store the one or more instructions 524.

The term "machine readable medium" may include any medium that is capable of storing, encoding, or carrying instructions for execution by the machine 500 and that cause the machine 500 to perform any one or more of the techniques of the present disclosure, or that is capable of storing, encoding or carrying data structures used by or associated with such instructions. Non-limiting machine-readable medium examples may include solid-state memories, and optical and magnetic media. In an example, machine readable media may exclude transitory propagating signals (e.g., non-transitory machine-readable storage media). Specific examples of non-transitory machine-readable storage media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 524 may further be transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, LoRa®/LoRaWAN® LPWAN standards, etc.), IEEE 802.15.4 family of standards, peer-to-peer (P2P) networks, 3rd Generation Partnership Project (3GPP) standards for 4G and 5G wireless communication including: 3GPP Long-Term evolution (LTE) family of standards, 3GPP LTE Advanced family of standards, 3GPP LTE Advanced Pro family of standards, 3GPP New Radio (NR) family of standards, among others. In an example, the network interface device 520 may include one or more physical jacks (e.g., Ethernet, coaxial, or phone jacks) or one or more antennas to connect to the communications network 526. In an example, the network interface device 520 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 500, and includes digital or analog communications signals or other intangible medium to facilitate communication of such software.

ADDITIONAL NOTES

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A system for event-based learning of alert conditions, for multi-dimensional data, comprising:
    a storage device, comprising a data store to host data provided from a multi-dimensional data processing system, the data maintained in a graph cube network;
    at least one processor; and
    memory including instructions that, when executed by the at least one processor, cause the at least one processor to perform operations to:
        evaluate a set of training data from the data store to train a problem correlation machine learning model that includes a feature set correlated to problematic performance of intersections in the graph cube network;
        process data obtained from the multi-dimensional data processing system, to identify the data as corresponding to a data event;
        generate a definition for the data event, including a set of key performance indicators (KPIs) for the data event;
        apply a feature importance analysis machine learning algorithm to the set of KPIs to identify one or more features of the feature set that indicate a persistent issue;
        establish an alert condition for the data event based on the one or more features;
        store the alert condition in the multi-dimensional data processing system in correspondence with a scope of the alert condition
        in response to establishment of the alert condition, evaluate the alert condition and the set of KPIs using the problem correlation machine learning model adopting the one or more features that indicate the persistent issue to calculate a probability for a root cause of the alert condition;
        automatically identify the root cause of the alert condition based on the probability; and
        store the root cause with the alert condition in the multi-dimensional data processing system.

2. The system of claim 1, the memory further comprising instructions that, when executed by the at least one processor, cause the at least one processor to perform operations to:
identify scopes for a set of intersections of a graph data structure corresponding to the alert condition; and
iterate through the set of intersections based on its scope to calculate measures for the set of KPIs.

3. The system of claim 2, the memory further comprising instructions that, when executed by the at least one processor, cause the at least one processor to perform operations to:
aggregate the measures for the set of KPIs to calculate a KPI metric for the alert condition; and
store the KPI metric for the data event in the multi-dimensional data processing system.

4. The system of claim 1, wherein to generate the definition for the data event, the instructions cause the at least one processor to use an alert measure obtained from the data.

5. The system of claim 1, wherein to generate the definition for the data event, the instructions cause the at least one processor to generate the data event with a representational state transfer (REST) of an application programming interface (API).

6. The system of claim 1, wherein the alert condition is determined based on measures calculated for the set of KPIs.

7. The system of claim 1, the memory further comprising instructions that cause the at least one processor to perform operations to:
create a calculation configuration for the data event based on the set of KPIs; and
evaluate historical data from the multi-dimensional data processing system with the calculation configuration to calculate the set of KPIs, wherein the calculation configuration includes a set of rules for calculating measures for the set of KPIs.

8. The system of claim 7, the memory further comprising instructions that, when executed by the at least one processor, cause the at least one processor to perform operations to:
determine a scope for the set of KPIs, wherein the scope defines a portion of the multi-dimensional data processing system to be evaluated;
obtain a dataset from the multi-dimensional data processing system based on the scope; and
calculate measures for the set of KPIs using the dataset, wherein the alert condition is established using the measures for the set of KPIs.

9. At least one non-transitory machine-readable medium including instructions for event-based learning of alert conditions, for multi-dimensional data that, when executed by at least one processor, cause the at least one processor to perform operations to:
evaluate a set of training data from a data store stored in a graph cube network of a multi-dimensional data processing system to train a problem correlation machine learning model that includes a feature set correlated to problematic performance of intersections in the graph cube network;
process data obtained from the multi-dimensional data processing system, to identify the data as corresponding to a data event;
generate a definition for the data event, including a set of key performance indicators (KPIs) for the data event;
apply a feature importance analysis machine learning algorithm to the set of KPIs to identify one or more features of the feature set that indicate a persistent issue;
establish an alert condition for the data event based on the one or more features;
store the alert condition in the multi-dimensional data processing system in correspondence with a scope of the alert condition;
in response to establishment of the alert condition, evaluate the alert condition and the set of KPIs using the problem correlation machine learning model adopting the one or more features that indicate the persistent issue to calculate a probability for a root cause of the alert condition;
automatically identify the root cause of the alert condition based on the probability; and
store the root cause with the alert condition in the multi-dimensional data processing system.

10. The at least one non-transitory machine-readable medium of claim 9, further comprising instructions that, when executed by the at least one processor, cause the at least one processor to perform operations to:
identify scopes for a set of intersections of a graph data structure corresponding to the alert condition; and
iterate through the set of intersections based on its scope to calculate measures for the set of KPIs.

11. The at least one non-transitory machine-readable medium of claim 10, further comprising instructions that, when executed by the at least one processor, cause the at least one processor to perform operations to:
aggregate the measures for the set of KPIs to calculate a KPI metric for the alert condition; and
store the KPI metric for the data event in the multi-dimensional data processing system.

12. The at least one non-transitory machine-readable medium of claim 9, wherein to generate the definition for the data event, the instructions cause the at least one processor to use an alert measure obtained from the data.

13. The at least one non-transitory machine-readable medium of claim 9, wherein to generate the definition for the data event, the instructions cause the at least one processor to generate the data event with a representational state transfer (REST) of an application programming interface (API).

14. The at least one non-transitory machine-readable medium of claim 9, wherein the alert condition is determined based on measures calculated for the set of KPIs.

15. The at least one non-transitory machine-readable medium of claim 9, further comprising instructions that cause the at least one processor to perform operations to:
create a calculation configuration for the data event based on the set of KPIs; and
evaluate historical data from the multi-dimensional data processing system with a calculation configuration to calculate the set of KPIs, wherein the calculation configuration includes a set of rules for calculating measures for the set of KPIs.

16. The at least one non-transitory machine-readable medium of claim 15, further comprising instructions that, when executed by the at least one processor, cause the at least one processor to perform operations to:
determine a scope for the set of KPIs, wherein the scope defines a portion of the multi-dimensional data processing system to be evaluated;
obtain a dataset from the multi-dimensional data processing system based on the scope; and
calculate measures for the set of KPIs using the dataset, wherein the alert condition is established using the measures for the set of KPIs.

17. A method for event-based learning of alert conditions, for multi-dimensional data comprising:

evaluating a set of training data from a data store stored in a graph cube network of a multi-dimensional data processing system to train a problem correlation machine learning model that includes a feature set correlated to problematic performance of intersections in the graph cube network;

processing data obtained from the multi-dimensional data processing system, to identify the data as corresponding to a data event;

generating a definition for the data event, including a set of key performance indicators (KPIs) for the data event;

applying a feature importance analysis machine learning algorithm to the set of KPIs to identify one or more features of the feature set that indicate a persistent issue;

establishing an alert condition for the data event based on the one or more features;

storing the alert condition in the multi-dimensional data processing system in correspondence with a scope of the alert condition;

in response to establishment of the alert condition, evaluating the alert condition and the set of KPIs using the problem correlation machine learning model adopting the one or more features that indicate the persistent issue to calculate a probability for a root cause of the alert condition;

automatically identifying the root cause of the alert condition based on the probability; and storing the root cause with the alert condition in the multi-dimensional data processing system.

18. The method of claim 17, further comprising:
identifying scopes for a set of intersections of a graph data structure corresponding to the alert condition; and
iterating through the set of intersections based on its scope to calculate measures for the set of KPIs.

19. The method of claim 18, further comprising:
aggregating the measures for the set of KPIs to calculate a KPI metric for the alert condition; and
storing the KPI metric for the data event in the multi-dimensional data processing system.

20. The method of claim 17, wherein generating a definition for the data event, uses an alert measure obtained from the data.

* * * * *